Oct. 18, 1960   J. W. GRAY   2,957,135
FREQUENCY MEASURING DEVICE
Filed Dec. 18, 1956

INVENTOR.
JOHN W. GRAY
BY
ATTORNEY

United States Patent Office 2,957,135
Patented Oct. 18, 1960

2,957,135

FREQUENCY MEASURING DEVICE

John W. Gray, Pleasantville, N.Y., assignor to General Precision, Inc., a corporation of Delaware Filed Dec. 18, 1956, Ser. No. 629,104

8 Claims. (Cl. 324—78)

This device relates to cyclo-counting frequency meters and more specifically to meters having an output shaft speed representative of an electrical input frequency.

The frequency of an alternating potential can be measured by employing it to charge a condenser which is regularly discharged, rectifying the induced currents and masuring the resulting direct current, the magnitude of which is proportional to the input frequency.

In the present invention the condenser unilateral discharge current is amplified and applied to a motor, the speed of which is then proportional to the input frequency. This proportionality is secured by the employment of an electromechanical feedback circuit and, by the employment of clipping circuits, the instrument scale, or ratio of output speed to input frequency, is adjustably controlled.

One purpose of this invention is to provide an instrument for measuring the frequency of an electrical input signal in terms of the speed of a shaft.

Another purpose of this invention is to provide a frequency meter having shaft speed as its output, the ratio of its output shaft speed to its input electrical frequency being adjustable.

Still another purpose is to provide a voltage axis crossing counter, the output indication being a shaft speed the proportionality to the axis crossing frequency of which is made adjustable.

A further understanding of this invention may be secured from the detailed description and associated drawings in which.

Figure 1:
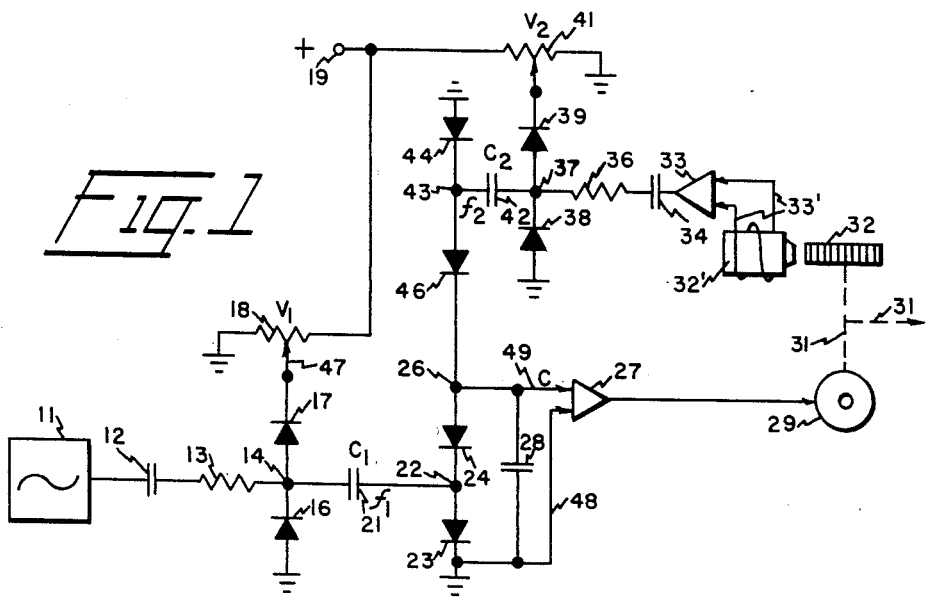
Figure 1 is a schematic drawing of an embodiment of the invention.

Referring now to Fig. 1, a source of electrical energy the frequency of which is to be measured is indicated by the rectangle 11. The potential of this energy need not be sinusoidal or even periodic, but since the present invention operates to count cycles, the axis crossings of any varying potential may be counted. The only requirement is that the potential be large enough so that after clipping, the wave form will be approximately trapezoidal and will substantially completely charge the measuring capacitor during the time of occurrence of the flat top of the trapezoidal form.

The output of the signal source 11 is connected through a large coupling capacitor 12 and decoupling resistor 13 to terminal 14 of a limiting or clipping circuit comprising diodes 16 and 17. These diodes are connected in series aiding, with the positive side of diode 16 grounded and the negative side of diode 17 connected to an adjustable source of positive potential $V_1$ represented by voltage divider 18 connected to a positive source terminal 19. Median terminal 14 of the clipping diodes 16 and 17 is also connected through a measuring capacitor 21 to the midpoint 22 of two diodes 23 and 24. The negative terminal of diode 23 is grounded and the positive terminal 26 of diode 24 is connected to a high-gain direct-coupled amplifier 27. A smoothing capacitor 28 is connected across the amplifier input. The amplifier output is connected to a motor 29, the speed of whose shaft 31 constitutes the output quantity of the device.

The output shaft 31 is also connected in a feedback loop the first element of which is a tone wheel 32. The tone wheel may be a synchronous alternating current generator consisting of a toothed soft iron rotor 32 and a solenoid 32'. The solenoid is provided with either a permanent magnet or an electromagnet provided with an output winding energizing output conductors 33'. Rotation of rotor 32 varies the magnetic flux of the magnet as the teeth pass the magnet's pole, setting up an alternating voltage across conductors 33', the frequency of this alternating current being proportional to rotor speed. The conductors 33' are connected to an amplifier 33, and the amplified signal is applied through large capacitor 34 and resistor 36 to the median junction 37 of two clipping diodes 38 and 39 connected in series aiding relationship. The positive terminal of diode 38 is grounded and the negative terminal of diode 39 is connected to an adjustable source of positive potential $V_2$ represented by voltage divider 41 and positive source terminal 19. Median terminal 37 is also connected through a measuring capacitor 42 to the median terminal 43 of two diodes 44 and 46 connected in series aiding relation. The positive terminal of diode 44 is grounded and the negative terminal of diode 46 is connected to terminal 26, closing the feedback loop.

The eight diodes including the clipping diodes 16, 17, 38 and 39 and the cycle-counting diodes 23, 24, 44 and 46 may be of any type as, for example, electronic discharge tubes or solid semiconductors such as germanium or silicon diodes. However, silicon junction diodes are much preferred, particularly because of their low-drift characteristic and their high temperature capability.

In the operation of this device the input signal potential, being coupled through large capacitor 12, varies about a median axis. The resistance of resistor 13 is very high compared to the forward resistances of diodes 16 and 17, so that the latter resistances may be neglected. The negative peaks of the signal are limited by diode 16 so that they never become more negative than ground potential, and the positive peaks are limited by the potential $V_1$ of the slider 47 of voltage divider 18 so that they never become more positive than the potential $V_1$. All signal voltage variations greater than these limits are therefore clipped and the resulting wave form has flat tops and bottoms. As an example, an input sine wave would assume a form approximating the trapezoidal shape of Fig. 2.

Figure 2:
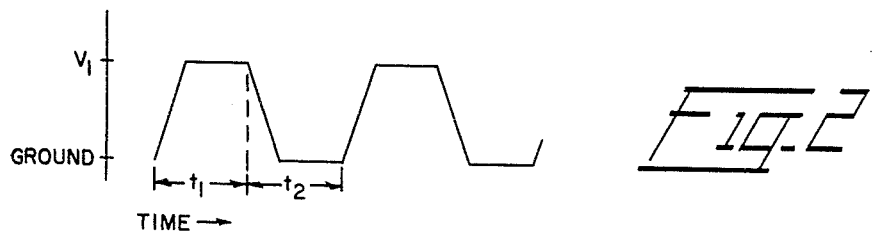
Figures 2 and 3 are graphs of current and voltage wave forms illustrating operation of the invention.

During an upward-going half cycle of the input signal such as during the time $t_1$, Fig. 2, the left side of measuring capacitor 21 is charged to the potential $V_1$ and held there. However, the right side of this capacitor is prevented from rising above ground zero potential by diode 23, Fig. 1, so that a current flows from the right side of capacitor 21 through diode 23 to ground and this side of the capacitor remains at ground potential. The time constant of the capacitance $C_1$ of capacitor 21 with the forward resistance of diode 23 or 24 is made so small relative to the period of the input signal being measured that substantially all of the induced charge on the right side of capacitor 21 is drained well before the end of time $t_1$.

During the downward-going half cycle of the input signal, namely, during time $t_2$, Fig. 2, the left side of capacitor 21, Fig. 1 is brought to zero or ground potential, inducing a potential of $-V_1$ at junction 22. Disregarding, for the present, diodes 44 and 46, this potential will induce a current from ground through ground conductor 48, amplifier 27, amplifier signal input conductor 49, junction 26 and diode 24.

Figure 3:
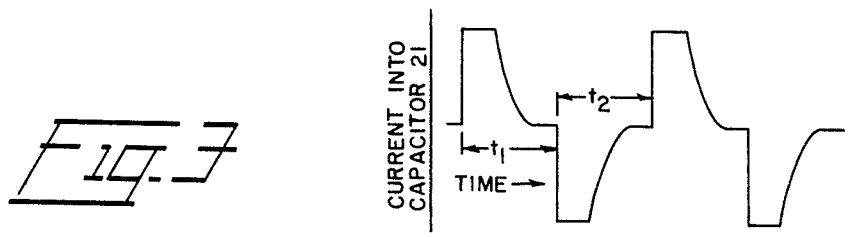

The current flowing into and out of the right side of capacitor 21 is depicted by the graph of Fig. 3, positive current flowing out of the capacitor through diode 23 to ground being represented by the upper half cycles of the graph and positive current flowing through diode 24 into the capacitor being represented by the lower half cycles. The quantity of charge in one cycle is the instantaneous negative current $i_n$ integrated over the period T of one cycle, or $$q=\int_0^T i_n dt \qquad (1)$$

The average current during one cycle is $$I=\frac{1}{T}\int_0^T i_n dt \qquad (2)$$

Combining (1) and (2)

$$I=\frac{q}{T}=qf_1$$

in which $f_1$ is the frequency of the input signal. Since $q=CV$, $$I=f_1 C_1(V_1+e) \qquad (3)$$

in which $C_1$ is the capacitance of capacitor 21, $V_1$ is its limit potential, and $e$ is the error potential. That is, $e$ is the dynamic potential drop through the input circuit of amplifier 27 necessary to overcome losses or necessitated by the fact that the amplifier gain is less than infinite. It is advisable to employ a high gain amplifier so that at null $e$ is very close to zero in magnitude.

Equation 3 states that the average current through diode 24 is proportional to the frequency of the input signal.

In the operation of this circuit, assume that the capacitances $C_1$ and $C_2$ of capacitors 21 and 42 are equal and that the limit potentials $V_1$ and $V_2$ are equal. The time constant of either capacitor circuit, one being capacitor 21 with the forward resistance of diode 24 or 23, and the other being capacitor 42 with the forward resistance of diode 38 or 39, is made to be materially less than the duration of the trapezoidal flat top of the form of Fig. 2. When no current flows through diode 46, then an input signal from generator 11 produces a current I in diode 24 in accordance with Equation 3. This current is drawn from capacitor 28 and causes a negative error volatge $e$. This error voltage is amplified and applied to the motor 29, which starts and increases in speed. The generator 32 applies a potential of increasing frequency $f_2$ to amplifier 33, resulting in current proportional to $f_2$ through diode 46. This current applied to junction 26 reduces the current drain from capacitor 28 and causes the error voltage $e$ to rise toward ground or zero potential. As the error volatge $e$ approaches zero the speed of motor 29 is reduced until the current through diode 46 substantially equals that through diode 24 and error voltage $e$ is nearly zero. If a very high gain amplifier be used it can be said that the currents through diodes 46 and 24 are exactly equal and that the error voltage $e$ is exactly zero. The current flow $i_{46}$ through diode 46 therefore is $$i_{46}=f_2 C_2(V_2-e) \qquad (4)$$

Since motor shaft speed $s$ and generator 32 frequency $f_2$ are proportional, $$s=kf_2 \qquad (5)$$

At null, from Equations 3, 4 and 5, $$s=kf_2=\frac{kC_1 V_1}{C_2 V_2}f_1 \qquad (6)$$

That is, when the capacities $C_1$ and $C_2$ are equal, and $V_1$ equals $V_2$, the frequency $f_2$ of generator 32 is exactly equal to the input signal axis-crossing frequency $f_1$, and the output shaft speed $s$ is linearly proportional to the generator frequency $f_2$. In order to make any desired change in the output quantity scale, so that it is any desired fraction or multiple of the input quantity, it is only necessary to change $V_1$ or $V_2$, or both, by means of their voltage dividers 18 and 41.

The voltage dividers 18 and 41 may be either manually or automatically actuated. As an example of automatic actuation, it may be desired to convert an input signal frequency into a shaft speed, and in addition to multiply or divide the signal frequency by a correction. This may be done by applying the correction signal to adjust either the voltage divider 18 or voltage divider 41.

What is claimed is:

1. An electrical frequency measuring device comprising, a measuring capacitor, means impressing fluctuating electrical energy having a trapezoidal waveshape thereon, a pair of measuring rectifiers connected in series aiding relation through a common terminal, means connecting said measuring capacitor to said common terminal whereby a current is caused to flow through one of said pair of measuring rectifiers, a pair of feedback rectifiers connected in series aiding relation through a feedback common terminal, a common junction connecting said pair of feedback rectifiers to said pair of measuring rectifiers whereby said current is supplied through the pair of feedback rectifiers, and a rate servomechanism having a mechanical rate output constituting the output of said frequency measuring device, said rate servomechanism including an amplifier, motor generator and feedback capacitor all connected in tandem, said amplifier being connected to the common junction of said measuring and feedback rectifiers and said feedback capacitor being connected to said feedback common terminal.

2. A frequency meter having a shaft speed output comprising, a capacitor having alternating potential impressed thereacross, first, second, third and fourth diode rectifiers connected in series aiding relation, means connecting said capacitor to said second diode rectifier causing changing current flow therein at alternate half cycles of said potential, an amplifier connected to said second rectifier and excited therethrough during said alternate half cycles, a motor operated from the output of said amplifier, said motor shaft speed constituting said output, a generator operated by said motor, a feedback capacitor charged by the potential output of said generator, and means connecting said feedback capacitor to said third diode rectifier causing feedback current flow therein at alternate half cycles of said generator output potential, whereby at balance said feedback current equals said changing current and said shaft speed accurately represents the frequency of said alternating potential.

3. An electrical frequency measuring device comprising, four rectifiers connected in series aiding relationship in a closed ring circuit, a capacitor having electrical energy the frequency of which is to be measured impressed on one side thereof and its other side connected to one of a first pair of conjugate terminals of said ring circuit, servomechanism means having its input connected across the other pair of conjugate terminals of said ring circuit, said servomechanism means including an output shaft the rate of rotation of which is determined by the error signal applied to said servomechanism means input, means for generating a comparison signal the frequency of which is determined by the rate of rotation of said output shaft, and a second capacitor having said comparison signal impressed on one side thereof and its other side connected to the other terminal of said first pair of conjugate terminals of said ring circuit.

4. An electrical frequency measuring device comprising, clipping means having electrical energy the frequency of which is to be measured impressed thereon limiting the peak amplitude of said impressed energy, a closed ring circuit consisting of four rectifiers connected in series aiding relationships, a capacitor connected between said clipping means and one of a first pair of conjugate terminals of said ring circuit, servomechanism means having its input connected across the other pair of conjugate terminals of said ring circuit, said servomechanism means including an output shaft the rate of rotation of which is determined by the error signal applied to the input of said servomechanism means, means for generating a signal the frequency of which is determined by the rate of rotation of said output shaft, clipping means having said last mentioned signal impressed thereon for limiting the peak amplitude thereof, and a capacitor connected between said last mentioned clipping means and the other terminal of said first pair of conjugate terminals of said ring circuit.

5. A frequency measuring device in accordance with claim 4 including means connected to at least one of said clipping means for adjustably varying the peak amplitude of the signal transmitted thereby.

6. A frequency measuring device in accordance with claim 4 including means connected to each of said clipping means for adjustably varying the respective peak amplitude of the signals transmitted thereby.

7. A frequency measuring device, first adjustable means clipping a fluctuating input signal to produce a flat-topped wave form signal, a capacitor, means impressing said flat-topped signal on said capacitor, rectifier means connected to said capacitor whereby capacitor current passes through said rectifier means only during alternate half cycles of said flat-topped signal, an amplifier excited from said rectifier means, a motor operated by said amplifier, a generator rotated by said motor, second adjustable means clipping the output of said generator to produce a flat-topped feedback signal, a feedback capacitor, means impressing said clipped feedback signal on said feedback capacitor, feedback rectifier means connected to said feedback capacitor whereby feedback current passes through said feedback rectifier means only during alternate half cycles of said feedback signal, and means connecting said feedback rectifier means to said rectifier means whereby when capacitor and feedback currents are equal the shaft speed of said motor accurately represents the frequency of said fluctuating input signal multiplied by the adjustments of said first and second adjustable clipping means.

8. An electrical frequency measuring device comprising, a source of electrical energy the frequency of which is to be measured, clipping means having said energy impressed thereon and limiting the peak-to-peak amplitude thereof, a first pair of rectifiers connected in series aiding relation providing a series rectifier circuit having a common junction and a pair of rectifier remote end terminals, a capacitor connected between said clipping means and the common junction of said first pair of rectifiers, a servomechanism means having a pair of input terminals connected to the respective remote end terminals of said first pair of rectifiers with one of said input terminals connected to a fixed reference potential, said servomechanism means including a motor the speed of which is determined by the error signal at the input of said servomechanism means, a generator operated by said motor generating an alternating current signal the frequency of which is proportional to the speed of said motor, clipping means having said alternating current signal impressed thereon and limiting the peak-to-peak amplitude thereof, a second pair of rectifiers connected in series aiding relation and having their remote end terminals connected to the respective remote end terminals of said first pair of rectifiers, said first and second pairs of rectifiers being poled in the same direction, and a capacitor connected between said second mentioned clipping means and the common junction of said second pair of rectifiers.

References Cited in the file of this patent

UNITED STATES PATENTS

| | | |
|---|---|---|
| 2,584,866 | Gray | Feb. 5, 1953 |
| 2,965,980 | Leed | Nov. 30, 1954 |
| 2,716,208 | Coffin | Aug. 23, 1955 |
| 2,752,092 | McDonal | June 26, 1956 |
| 2,754,418 | Bennett | July 10, 1956 |

FOREIGN PATENTS

| | | |
|---|---|---|
| 657,626 | Great Britain | Sept. 26, 1951 |